(12) United States Patent
Yu et al.

(10) Patent No.: US 11,411,509 B2
(45) Date of Patent: Aug. 9, 2022

(54) SYSTEM AND METHOD FOR DETECTING THE PRESENCE OF INPUT POWER OF DIFFERENT TYPES

(71) Applicant: DELL PRODUCTS L.P., Round Rock, TX (US)

(72) Inventors: Wei Cheng Yu, New Taipei (TW); Geroncio O. Tan, Austin, TX (US); Chi Che Wu, Taipei (TW); Merle Wood, III, Round Rock, TX (US); Yung-Chang Chang, New Taipei (TW); Ya-Tang Hsieh, New Taipei (TW); Tsung-Cheng Liao, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/073,260

(22) Filed: Oct. 16, 2020

(65) Prior Publication Data

US 2022/0123664 A1   Apr. 21, 2022

(51) Int. Cl.
*H02M 7/217* (2006.01)
*G06F 1/26* (2006.01)
(Continued)

(52) U.S. Cl.
CPC ............ *H02M 7/217* (2013.01); *G06F 1/26* (2013.01); *G06F 1/28* (2013.01); *G06F 1/263* (2013.01);
(Continued)

(58) Field of Classification Search
CPC ... G06F 1/26; G06F 1/28; G06F 1/263; G06F 1/30; G06F 1/305; G06F 11/2015
(Continued)

(56) References Cited

U.S. PATENT DOCUMENTS 7,363,522 B2   4/2008 Prosperi
7,911,817 B2   3/2011 Kasprzak et al.
(Continued)

OTHER PUBLICATIONS

Wise Geek, "What Is An X Capacitor?", Sep. 16, 2020, 2 pgs.
(Continued)

*Primary Examiner* — Ji H Bae
(74) *Attorney, Agent, or Firm* — Egan, Enders & Huston LLP.

(57) ABSTRACT

Systems and methods are provided to implement power supply units (PSUs) that are capable of operating on input power having different types of input voltage waveforms, including, but not limited to, pure sinusoidal waveforms, non-pure sinusoidal waveforms, and non-sinusoidal waveforms. Such a PSU may operate to continue supplying DC output power to a system load as long as the PSU is powered by any one of a variety of such different input power types, while at the same time also effectively monitoring for presence of input power provided to the PSU and shutting down the PSU in event of absence or termination of the input power to the PSU. Such a PSU may also automatically identify and adapt to changes between different types of input power while at the same time continuing to supply DC output power to a system load in an uninterrupted manner for as long as some type of input power is being provided to the PSU.

20 Claims, 7 Drawing Sheets

(51) Int. Cl.
*G06F 1/28* (2006.01)
*G06F 1/30* (2006.01)
*G06F 11/20* (2006.01)

(52) U.S. Cl.
CPC ............. *G06F 1/30* (2013.01); *G06F 1/305* (2013.01); *G06F 11/2015* (2013.01)

(58) Field of Classification Search
USPC .................................. 713/300, 340; 714/14
See application file for complete search history.

(56) References Cited

U.S. PATENT DOCUMENTS

| | | | |
|---|---|---|---|
| 8,793,518 B2 | 7/2014 | Reddy | |
| 9,436,255 B2 | 9/2016 | Verdun | |
| 9,466,974 B2 | 10/2016 | Hsieh et al. | |
| 10,270,071 B2 | 4/2019 | Wang et al. | |
| 10,432,007 B2 | 10/2019 | Chang et al. | |
| 10,496,509 B2 | 12/2019 | Thompson et al. | |
| 2002/0186038 A1* | 12/2002 | Bretschneider | G06F 1/28 361/90 |
| 2010/0153765 A1* | 6/2010 | Stemen | G06F 1/3203 713/340 |
| 2013/0188405 A1* | 7/2013 | Jin | H02M 1/32 363/49 |
| 2017/0060668 A1* | 3/2017 | Farhan | G06F 12/0804 |
| 2018/0323624 A1 | 11/2018 | Chang et al. | |
| 2019/0332154 A1 | 10/2019 | Thompson et al. | |

OTHER PUBLICATIONS

Juan et al., "Systems And Methods To Support Peripheral Component Interconnect Express (PCIE) Auto-Bifuracation", U.S. Appl. No. 16/935,058, filed Jul. 21, 2020, 39 pgs.

* cited by examiner

SYSTEM AND METHOD FOR DETECTING THE PRESENCE OF INPUT POWER OF DIFFERENT TYPES

FIELD OF THE INVENTION

This invention relates generally to power supply units and, more particularly, to management of power supply units.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
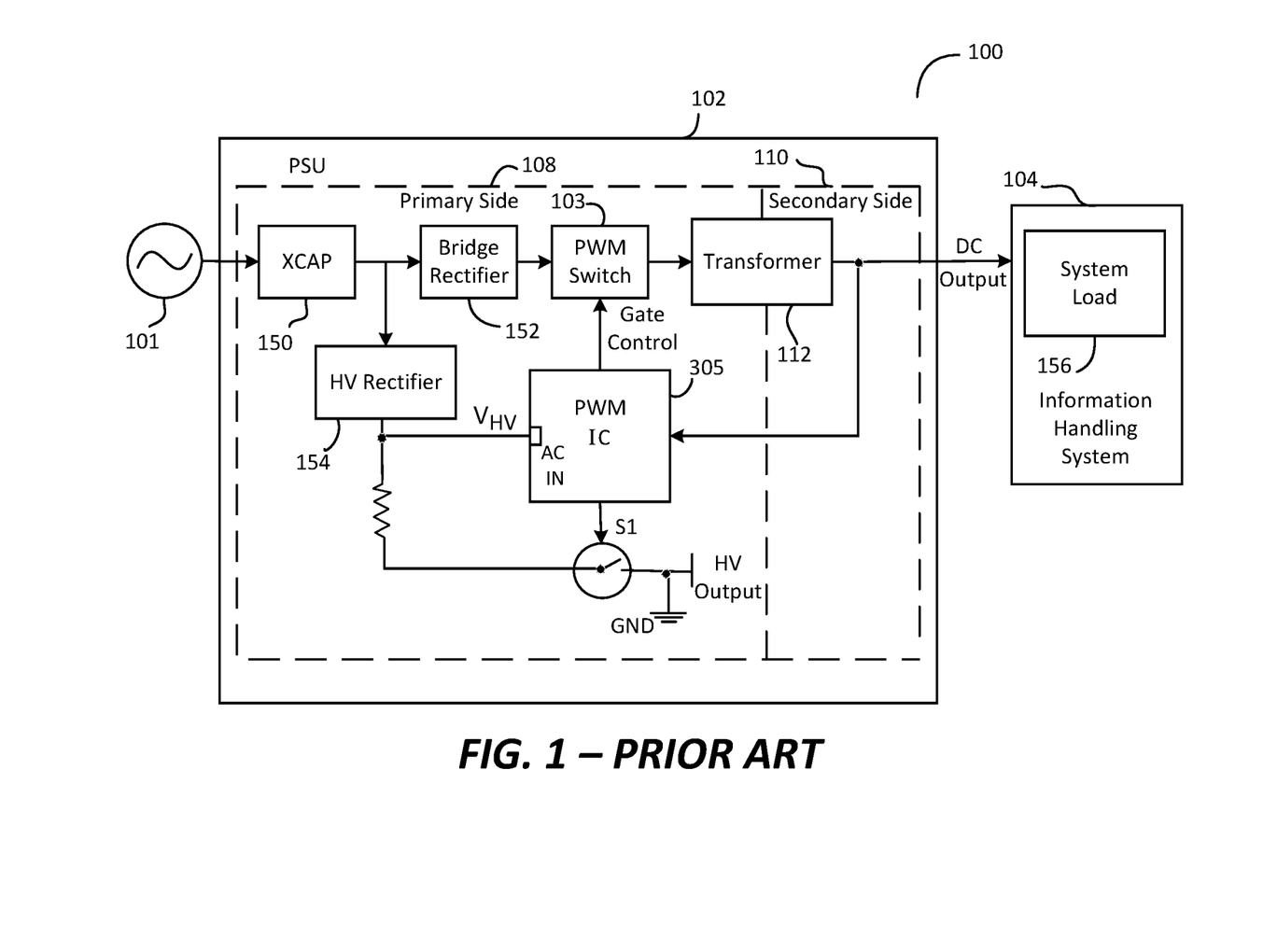
FIG. 1 is a block diagram illustrating a conventional PSU and information handling system.

FIG. 1 illustrates a block diagram of a conventional PSU 102 that receives AC current from an AC mains power source 101 and converts the received AC current to a DC current output of proper voltage that is provided to power-consuming components of a system load 156 of an information handling system 104. As shown in FIG. 1, PSU 102 is configured as a switching power supply that includes primary-side circuitry 108 and secondary side circuitry 110. Primary side circuitry 108 includes an "X-capacitor" (Xcap) 150 that is electrically coupled between line and neutral of the incoming AC power to filter interference. Primary side circuitry 108 also includes a bridge rectifier 152 that is coupled between the Xcap 150 and PWM switching circuitry 103. Bridge rectifier 152 converts the AC current to DC current, and a pulse-width modulation (PWM) integrated circuit (IC) 105 provides a gate driver control signal to control gate switching of transistors of PWM switching circuit 103 to vary the duty cycle of the DC current (i.e., based on DC current demand from power-consuming components of system load 156) before it is provided to primary side windings of transformer 112. Transformer circuitry 112 includes primary and secondary side windings that together provide a reduced or stepped down voltage for the secondary side DC output power that is provided from PSU 102 to system load 156 of information handling system 104 as shown.

As shown in FIG. 1, conventional PSU 102 also includes a rectifier 154 that provides a high voltage (HV) DC output, and an ACIN pin of PWM IC 105 is coupled as shown to measure voltage of this HV DC output ($V_{HV}$). A switch S1 is provided to discharge the AC line voltage from Xcap 150 to ground to prevent danger of electric shock to a user when the AC plug of PSU 102 is removed from a supply socket for AC mains 101. During normal operation with AC mains 101 providing pure sine wave AC power, PWM IC 105 is programmed to monitor $V_{HV}$ to detect the rising and falling slope of the pure sine wave voltage of the AC power waveform provided from AC mains 101 to detect when the rising and falling slope of the pure sine wave voltage of AC input power stops, e.g., such as when an AC plug of PSU 102 has been removed from a socket of AC mains 101 or AC mains 101 has been turned off.

Figure 2:
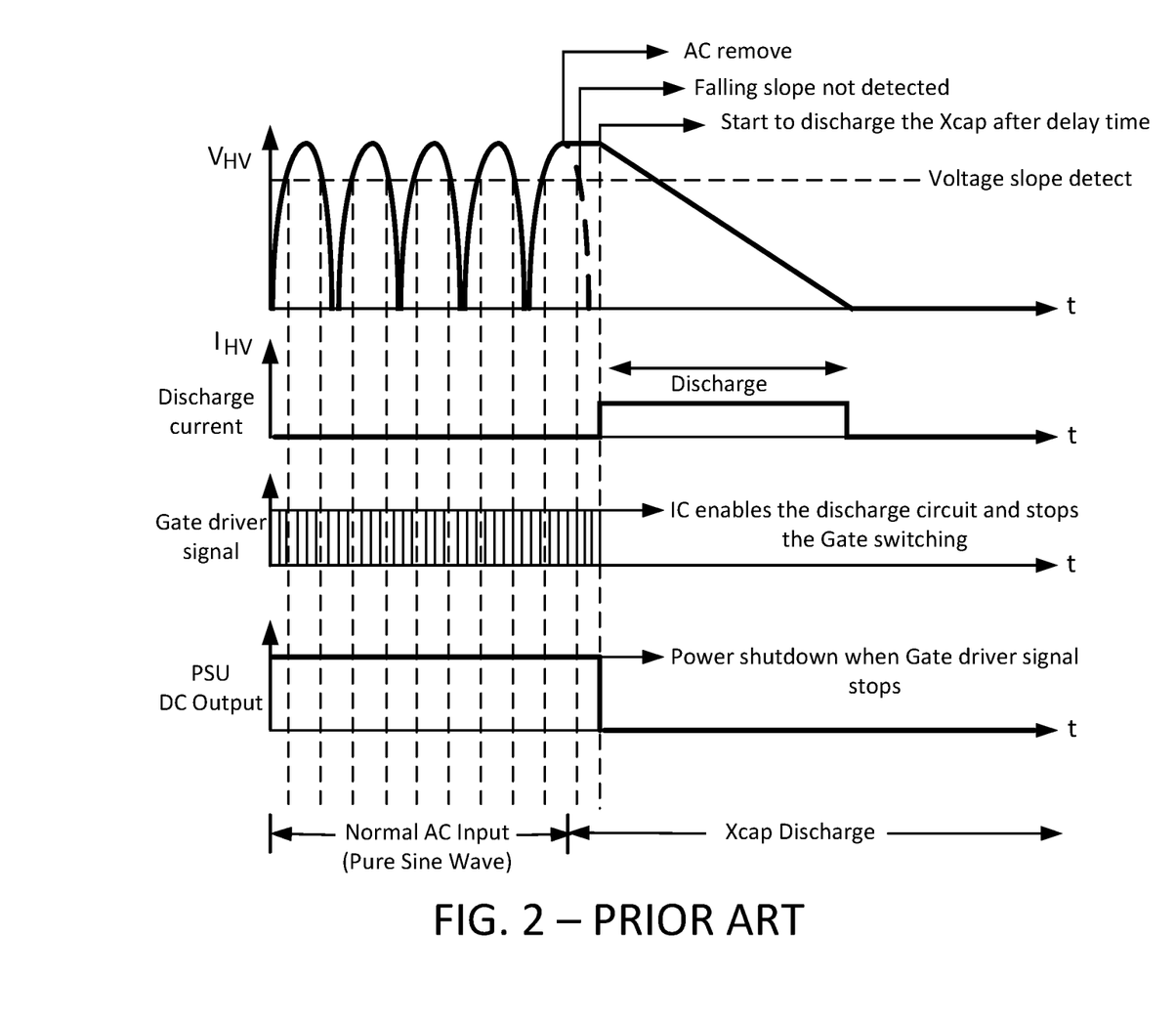
FIG. 2 illustrates simultaneous plots versus time of $V_{HV}$, Xcap discharge current to ground, gate driver control signal, and PSU DC output current for a conventional PSU.

As long as AC mains 101 continues to provide AC input power having a pure sine wave to PSU 102, PWM IC 105 maintains switch S1 in an open (OFF) state. However, when PWM IC 105 determines that the rising and falling slope of the pure sine wave voltage of power received from AC mains 101 has stopped, PWM IC 105 closes (turns ON) switch S1 to discharge voltage of Xcap 150 to ground, uses gate driver control signal to stop gate switching of transistors of PWM switching circuit 103, and thus shuts down PSU 102. This conventional operation is illustrated by FIG. 2, which shows simultaneous plots versus time of $V_{HV}$, Xcap discharge current to ground, gate driver control signal, and PSU DC output current for the conventional PSU 102 of FIG. 1.

In some cases, conventional PSU 102 may be provided with input power from a power source that has a non-pure sinusoidal waveform and therefore does not provide a pure sine waveform to PSU 102. One example of such an alternate power source is an uninterruptible power supply (UPS) that provides backup AC power to conventional PSU 102 during a failure of AC mains 101. Some UPS devices cannot supply AC input power having a pure sine waveform to PSU 102, but instead supply AC input power having a square waveform to PSU 102. In such a case, the square waveform of the AC input power from the UPS has no voltage slope, and the monitored $V_{HV}$ exhibits a constant voltage rather than a voltage with rising and falling slope. Since PWM IC 105 cannot detect the presence of a rising and falling slope from the monitored $V_{HV}$, it closes switch S1 to discharge voltage of Xcap 150 to ground, uses gate driver control signal to stop gate switching of transistors of PWM switching circuit 103, and thus shuts down PSU 102. The same result occurs in the case where a DC input power is provided by a UPS or other power source to PSU 102. Thus, since the PWM IC 105 of conventional PSU 102 cannot identify presence of either a square waveform of a non-sinusoidal AC input power or a DC input power from a UPS, it unnecessarily shuts down PSU 102, which may in turn lead to unnecessary returns and/or repairs of the conventional PSU 102 and/or information handling system 104.

SUMMARY OF THE INVENTION

Disclosed herein are systems and methods that may be implemented to provide power supply units (PSUs) that are capable of operating on input power having different types of input voltage waveforms, including, but not limited to, pure sinusoidal waveforms (i.e., that exhibit a pure sine wave voltage waveform), non-pure sinusoidal waveforms (i.e., that exhibit a distorted or modified sine wave voltage waveform such as a square wave voltage waveform), and non-sinusoidal waveforms (e.g., such as a DC waveform). Using the disclosed systems and methods, a PSU may operate to continue supplying DC output power to a system load as long as the PSU is powered by any one of a variety of such different input power types, while at the same time also effectively monitoring for presence of input power provided to the PSU and shutting down the PSU in event of absence or termination of the input power to the PSU.

In one embodiment, a PSU may automatically identify and adapt to changes between different types of input power while at the same time continuing to supply DC output power to a system load in an uninterrupted manner for as long as some type of input power is being provided to the PSU. Examples of different types of power sources that may provide input power to operate such a PSU include, but are not limited to, an AC mains power system (e.g., that provides a pure sinusoidal voltage wave input power to the PSU), an uninterruptible power source (UPS) system (e.g., that provides a non-pure sinusoidal input power to the PSU, such as a square wave AC power input or other type of modified or distorted AC power input that does not have a pure sine wave), and a DC power source (e.g., that provides a non-sinusoidal full DC power input to the PSU). In one embodiment, the PSU may be configured to implement smart detection of input voltage type by identifying in real time whether the current input voltage type is pure sinusoidal, non-pure sinusoidal (e.g., square wave) or a DC voltage waveform. The PSU may then implement different techniques to detect presence or absence of the PSU input power based on the identified input voltage type.

During operation the PSU may also be configured to reliably detect when a variety of different power source types (e.g., pure sinusoidal, non-pure sinusoidal, or non-sinusoidal power sources) have been unplugged or otherwise disconnected from the PSU, and to respond to this detected power input disconnection by performing one or more automatic PSU shutdown actions such as discharging current from a Xcap to ground, terminating gate switching of a PWM switching circuit, and/or otherwise shutting the PSU down. In this way, the disclosed PSUs may be implemented to reliably produce DC output power from input power types having a variety of different voltage waveforms, thus providing improved reliability and user experience as compared to conventional PSUs that cannot identify or operate with a non-sinusoidal input power.

In one embodiment, a programmable integrated circuit (e.g., PWM integrated circuit) of a PSU may be programmed to confirm the presence of a non-pure sinusoidal input power or a non-sinusoidal input power when the presence of a rising and falling voltage slope characteristics of a pure sinusoidal input power are not detected by the programmable integrated circuit. To verify the presence of a non-pure sinusoidal input power or a non-sinusoidal input power (i.e., in the absence of detected rising and falling AC power slope), the PSU programmable integrated circuit may measure voltage at a power input node (i.e., that is electrically coupled to the PSU input power) before and after momentarily discharging current from the power input node, and then compare these before and after voltage measurements to determine any difference. Based on this comparison, presence of a non-pure sinusoidal PSU input power or a non-sinusoidal PSU input power may be determined to exist when the before and after voltage measurements are equal to each other, in which case no PSU shutdown actions are taken. However, complete absence of PSU input power may be determined to exist when the after-voltage measurement is less than the before-voltage measurement, in which case one or more PSU shutdown actions (e.g., including discharging a PSU X-capacitor) may be automatically taken.

In another embodiment, a programmable integrated circuit of the PSU may be further programmed to detect termination of an existing non-pure sinusoidal PSU input power or non-sinusoidal PSU input power once presence of such a PSU input power type is determined to exist as described above. To detect a subsequent removal of the non-pure sinusoidal PSU input power or non-sinusoidal PSU input power, the PSU programmable integrated circuit may continuously discharge current from a power input node that is electrically coupled to the PSU input power, while at the same time monitoring voltage at the power input node. In one embodiment, the magnitude of this continuous discharge current rate may be selected to be lower than the previous first momentary current rate in order to reduce PSU power consumption. In any case, continued presence of the non-pure sinusoidal PSU input power or non-sinusoidal PSU input power is determined to exist as long as monitored voltage at the power input node of the PSU does not decrease with time, and in which case no PSU shutdown actions are taken. However, termination (absence) of the non-pure sinusoidal PSU input power or non-sinusoidal PSU input power may be determined to exist when the monitored voltage at the power input node decreases with time, in which case one or more automatic PSU shutdown actions (e.g., including discharging the PSU Xcap) are therefore taken.

In one respect, disclosed herein is a method, including: operating a power supply unit (PSU) to receive input power in the PSU, and to provide a direct current (DC) output power from the PSU; monitoring for a presence of a rising and falling voltage slope of input power present at a power input node of the PSU; providing the DC output power from the PSU whenever the presence of the rising and falling voltage slope is detected at the power input node of the PSU; and measuring and comparing voltage at the power input node of the PSU before and after momentarily discharging current at a first rate from the power input node whenever presence of the rising and falling voltage slope is not detected at the power input node of the PSU. The method may include then: continuing to provide the DC output power from the PSU when the presence of the rising and falling voltage slope is not detected at the power input node of the PSU only when the before-voltage measurement and the after voltage-measurement made at the power input node of the PSU are determined to be equal to each other, and otherwise terminating the DC output power from the PSU when the presence of the rising and falling voltage slope is not detected at the power input node of the PSU and the after-voltage measurement made at the power input node is determined to be less than the before-voltage measurement made at the power input node.

In another respect, disclosed herein is a system, including: a power supply unit (PSU) having a power input receiving input power to the PSU and a power output providing direct current (DC) output power from the PSU; where the PSU includes a programmable integrated circuit coupled to control the DC output power of the PSU, to monitor a voltage of a power input node coupled to the power input of the PSU, and to control discharge of current from the power input node. The programmable integrated circuit may be programmed to: monitor for a presence of a rising and falling voltage slope corresponding to a pure alternating current (AC) input power present at the power input node of the PSU, provide the DC output power from the power output of the PSU whenever the presence of the rising and falling voltage slope is detected at the power input node of the PSU, and measure and compare voltage at the power input node of the PSU before and after momentarily discharging current at a first rate from the power input node whenever presence of the rising and falling voltage slope is not detected at the power input node of the PSU. The programmable integrated circuit may be further programmed to then: continue to provide the DC output power from the PSU when the presence of the rising and falling voltage slope is not detected at the power input node of the PSU only when the before-voltage measurement and the after voltage-measurement made at the power input node of the PSU are determined to be equal to each other, and otherwise terminate the DC output power from the PSU when the presence of the rising and falling voltage slope is not detected at the power input node of the PSU and the after-voltage measurement made at the power input node is determined to be less than the before-voltage measurement made at the power input node.

In another respect, disclosed herein is an information handling system, including: a DC-powered system load; and a power supply unit (PSU) having a power input receiving input power to the PSU and a power output providing direct current (DC) output power from the PSU to the DC-powered system load, the PSU including a programmable integrated circuit coupled to: control the DC output power of the PSU, to monitor a voltage of a power input node coupled to the power input of the PSU, and to control discharge of current from the power input node. The programmable integrated circuit may be programmed to: monitor for a presence of a rising and falling voltage slope corresponding to a pure alternating current (AC) input power present at the power input node of the PSU, provide the DC output power from the power output of the PSU to the DC-powered system load whenever the presence of the rising and falling voltage slope is detected at the power input node of the PSU, and measure and compare voltage at the power input node of the PSU before and after momentarily discharging current at a first rate from the power input node whenever presence of the rising and falling voltage slope is not detected at the power input node of the PSU. The programmable integrated circuit may be further programmed to then: continue to provide the DC output power from the PSU to the DC-powered system load when the presence of the rising and falling voltage slope is not detected at the power input node of the PSU only when the before-voltage measurement and the after voltage-measurement made at the power input node of the PSU are determined to be equal to each other, and otherwise terminate the DC output power from the PSU to the DC-powered system load when the presence of the rising and falling voltage slope is not detected at the power input node of the PSU and the after-voltage measurement made at the power input node is determined to be less than the before-voltage measurement made at the power input node.

DESCRIPTION OF ILLUSTRATIVE EMBODIMENTS

Figure 3A:
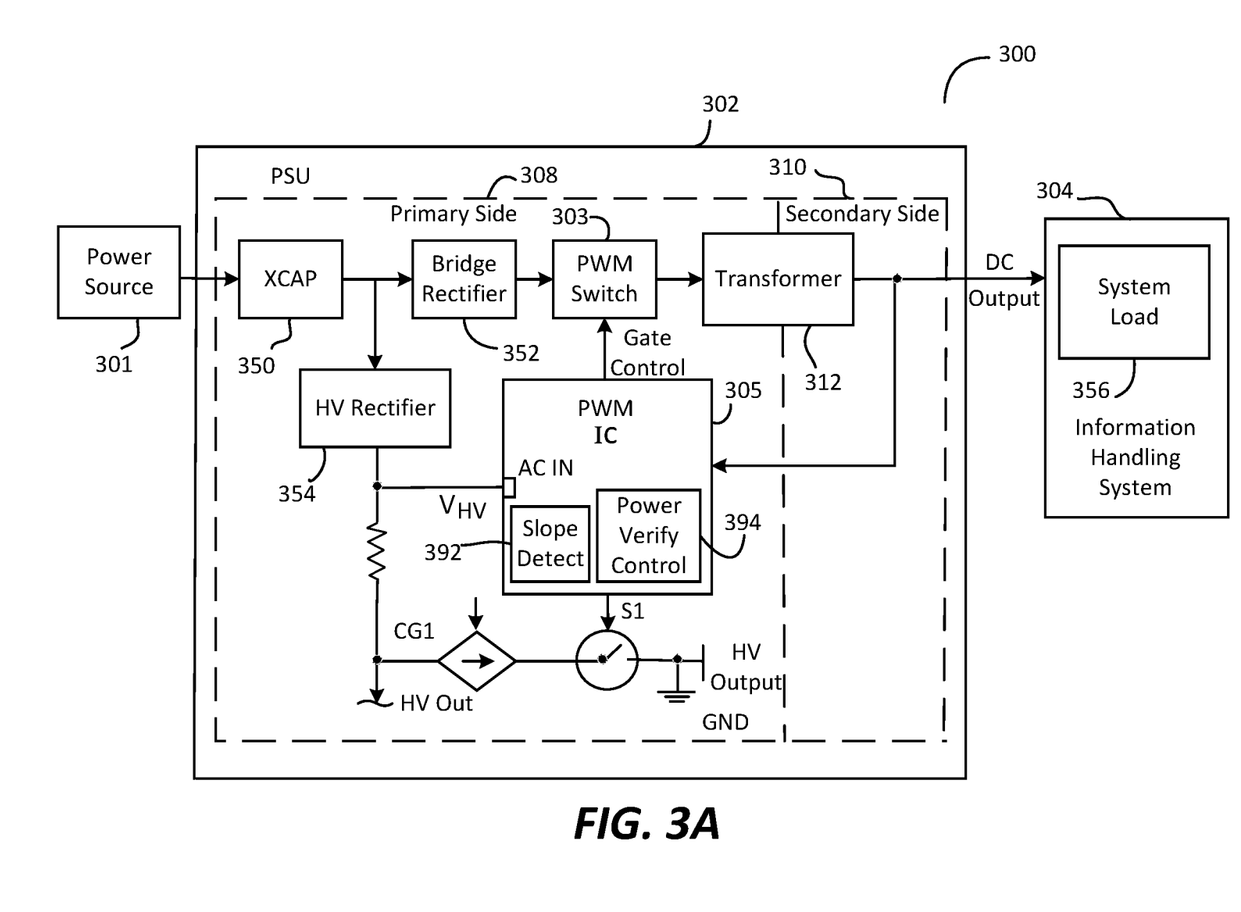
FIG. 3A is a block diagram illustrating a PSU and information handling system according to one exemplary embodiment of the disclosed systems and methods.

FIG. 3A illustrates a block diagram of a PSU 302 configured according to on exemplary embodiment of the disclosed systems and methods. As shown, PSU 302 is electrically coupled to receive electrical current from a power source 301 (e.g., AC mains, UPS, etc.) and to convert the received current to a DC current output of proper voltage that is provided across a DC power connection to DC power-consuming components of a DC-powered system load 356 of an information handling system 304. In one embodiment, information handling system 304 may be non-portable desktop computer, tower computer, computer server, etc., in which case PSU 302 may be an internal integrated power supply that is contained within a chassis enclosure of information handling system 304. In another exemplary embodiment, information handling system 304 may be portable information handing system (e.g., notebook computer, laptop computer, tablet computer, all-in-one computer, convertible computer, smart phone, etc.), in which case PSU 302 may be an integrated power supply that is contained within a chassis enclosure of information handling system 304.

Further information on possible power supply architecture and operation in regard to PSU 302 may be found, for example, in U.S. Pat. Nos. 7,363,522; 7,911,817; 9,436,255; 9,466,974; and 10,432,007; each of the foregoing patents being incorporated herein by reference in its entirety for all purposes. Further information on operation and architecture of non-portable information handling systems and UPSs may be found in United States Patent Application Publication No. 2019/0332154; and in U.S. patent application Ser. No. 16/935,058 filed Jul. 21, 2020, each of which is incorporated herein by reference in its entirety for all purposes. Further information on operation and architecture of battery-powered or portable information handling systems may be found in U.S. Pat. No. 10,496,509, which is incorporated herein by reference in its entirety for all purposes.

As shown in FIG. 3A, PSU 302 is configured as a switching power supply that includes primary-side circuitry 308 and secondary side circuitry 310. Primary side circuitry 308 includes Xcap 350 that is electrically coupled across or between two incoming conductors of power source 301 (e.g., between line and neutral of incoming AC power from an AC mains power source) to filter interference. Primary side circuitry 308 also includes a bridge rectifier 352 that is coupled between the Xcap 350 and PWM switching circuitry 303. Bridge rectifier 352 converts the AC current to DC current, and a pulse-width modulation (PWM) integrated circuit (IC) 305 provides a gate driver control signal to control gate switching of transistors of PWM switching circuit 303 to vary the duty cycle of the DC current (i.e., based on DC current demand from power-consuming components of system load 356) before it is provided to primary side windings of transformer 312. Transformer circuitry 312 includes primary and secondary side windings that together provide a reduced or stepped down voltage for the secondary side DC output power that is provided from PSU 302 to system load 356 of information handling system 304 as shown.

Figure 3B:
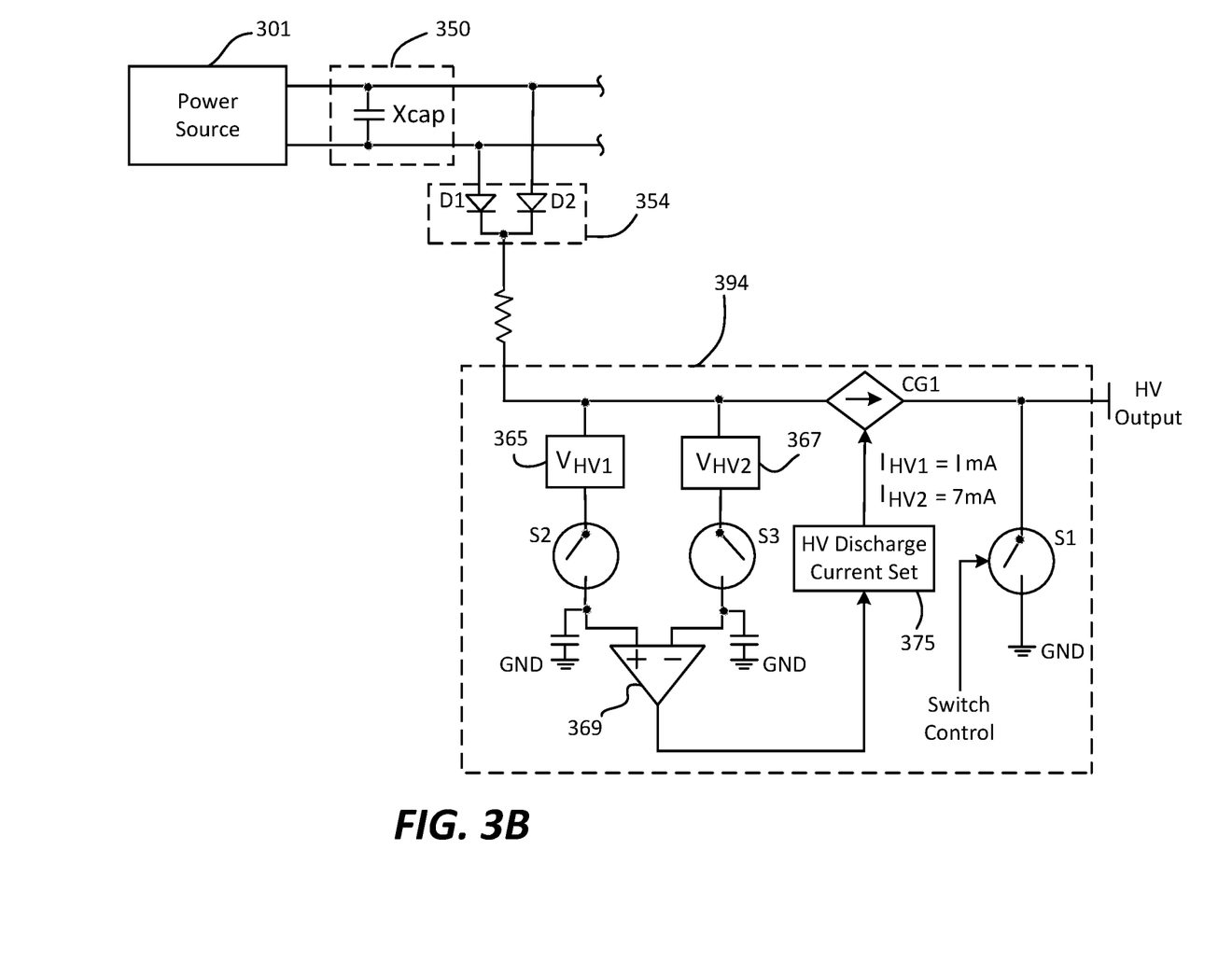
FIG. 3B illustrates circuitry and logic of a PSU according to one exemplary embodiment of the disclosed systems and methods.

As shown in FIG. 3A, PSU 302 of this embodiment also includes a rectifier 354 that provides a high voltage (HV) DC output, and an ACIN pin of PWM IC 305 is coupled as shown to measure voltage of this HV DC output ($V_{HV}$). A switch S1 is provided to discharge the incoming line voltage from Xcap 350 to ground to prevent danger of electric shock to a user when a plug of PSU 302 is removed from a supply socket for power source 301, or when power source 301 is otherwise disconnected from PSU 302. FIG. 3B illustrates further details of portions of circuitry and logic of PSU 302 that may be implemented to verify input power and control discharge of Xcap 350 during operation of PSU 302 as described further in relation to FIG. 4.

Figure 4:
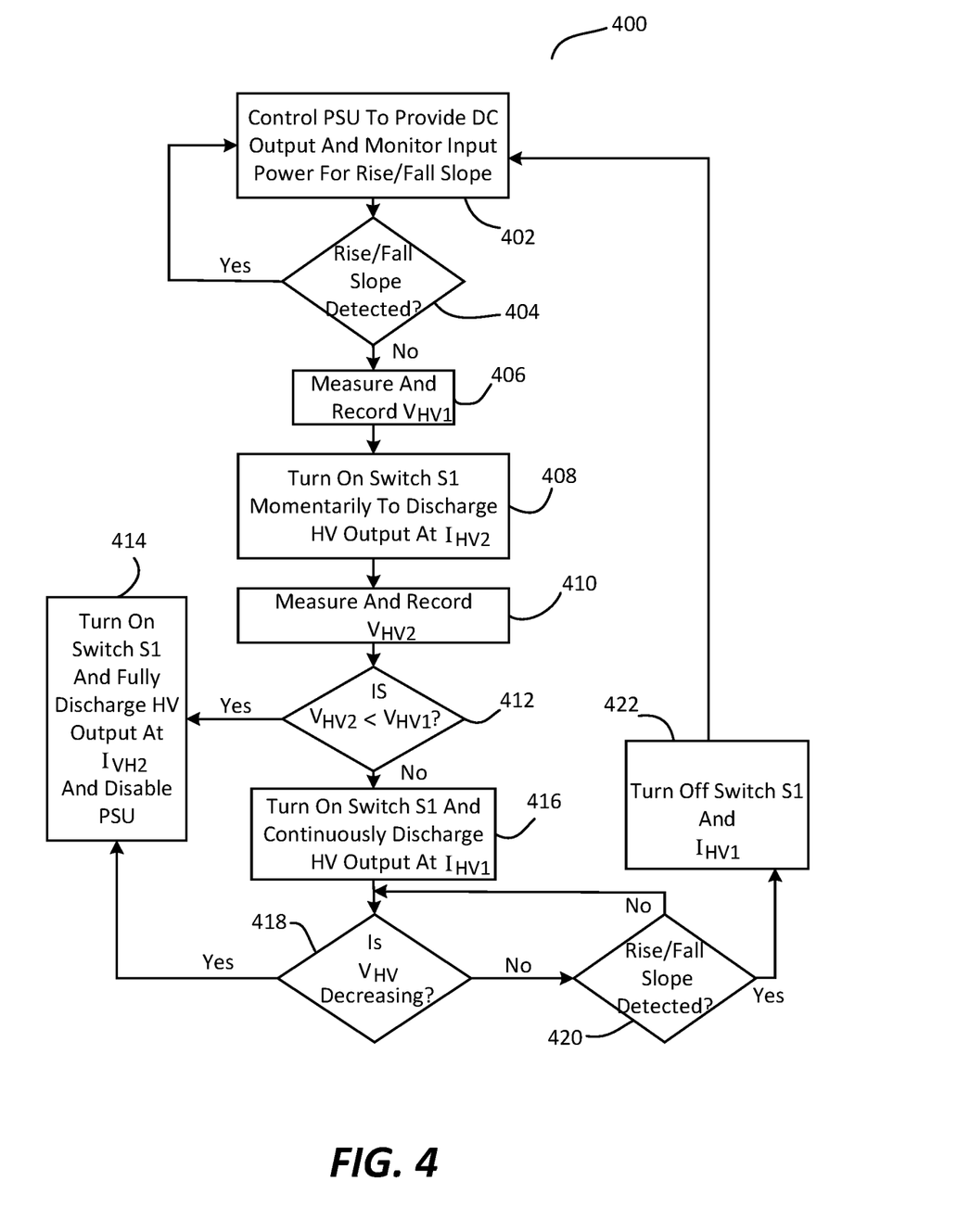
FIG. 4 illustrates methodology according to one exemplary embodiment of the disclosed systems and methods.
Figure 5:
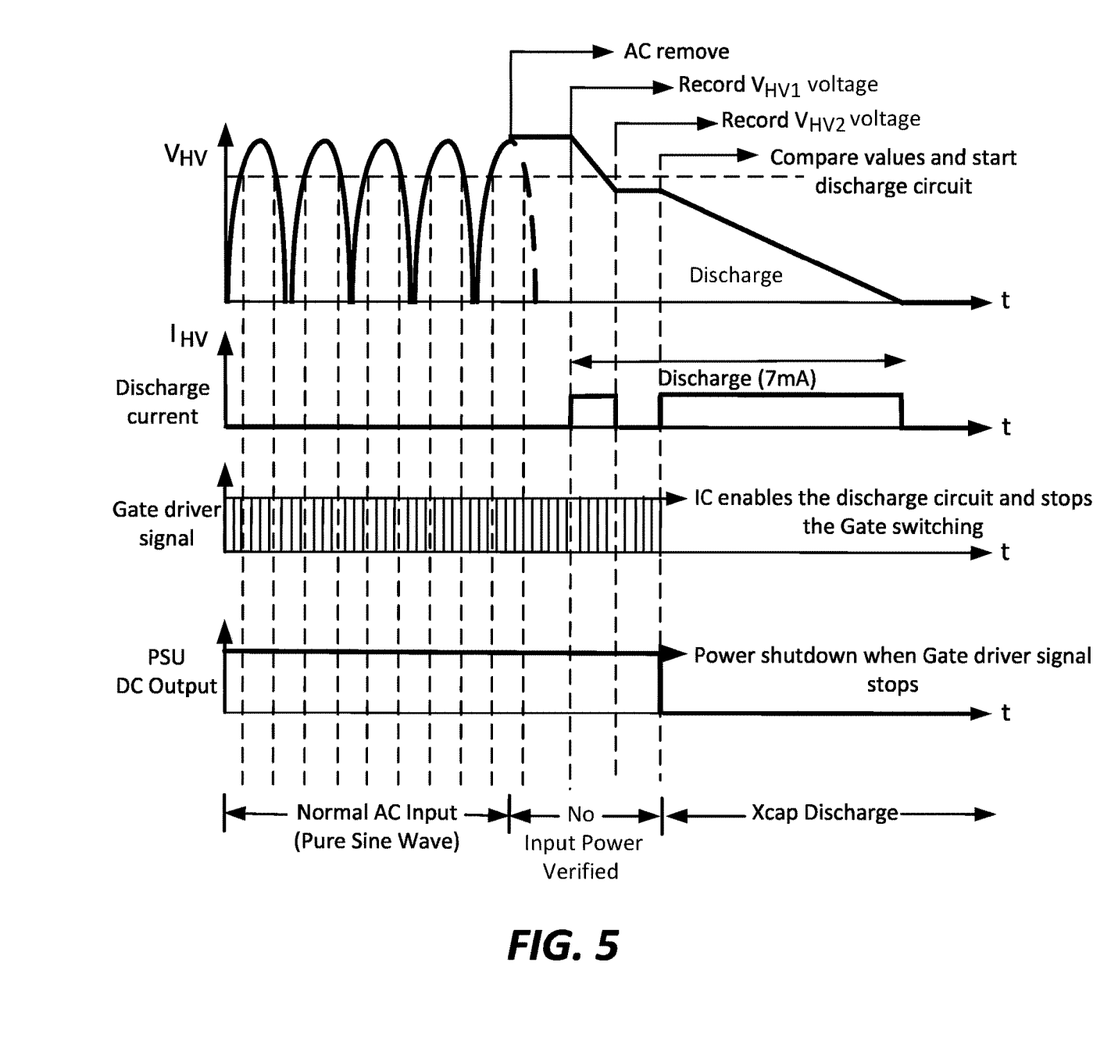
FIG. 5 illustrates simultaneous plots versus time of $V_{HV}$, Xcap discharge current to ground, gate driver control signal, and PSU DC output current for a PSU according to one exemplary embodiment of the disclosed systems and methods.
Figure 6:
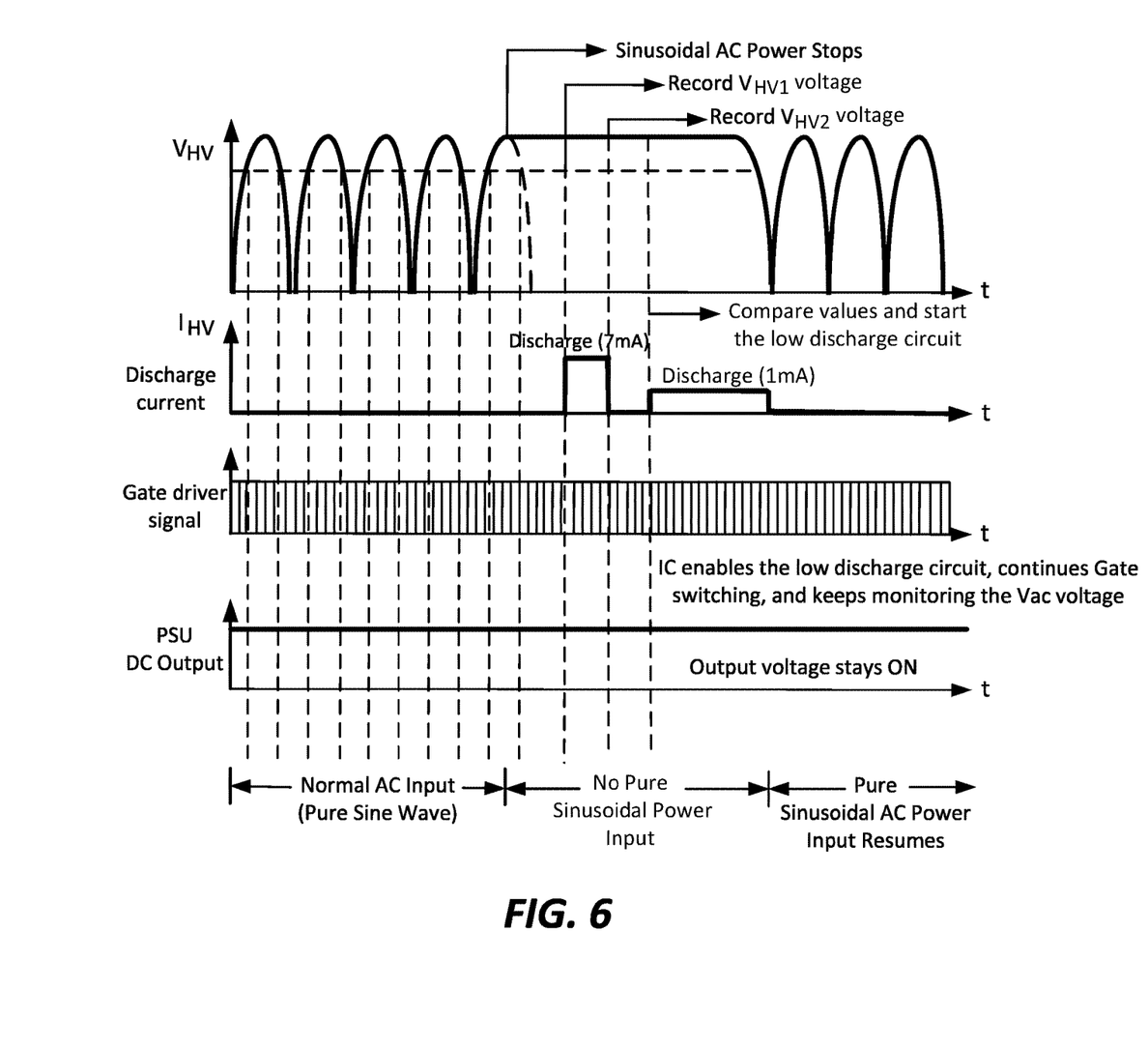
FIG. 6 illustrates simultaneous plots versus time of $V_{HV}$, Xcap discharge current to ground, gate driver control signal, and PSU DC output current for a PSU according to one exemplary embodiment of the disclosed systems and methods.

FIG. 4 illustrates one exemplary embodiment of methodology 400 that may be implemented during operation of PSU 302 of FIGS. 3A and 3B. Methodology 400 begins in step 402 with PSU receiving power from power source 301 with switch S1 in an open (OFF) state and providing gate driver control signal to control gate switching of transistors of PWM switching circuit 303 to provide DC output power to system load 356 of information handling system 304. Also in step 402, PWM IC 305 executes slope detection logic 392 to monitor $V_{HV}$ to detect if the rising and falling slope of a pure sinusoidal voltage of an AC power waveform is being provided from power source 301 as shown in FIGS. 5 and 6. As long as power source 301 continues to provide AC input power having a pure sine wave to PSU 302, slope detection logic 392 of PWM IC 305 detects the rise and fall of the pure AC sinusoidal voltage in step 404 and returns to step 402, while maintaining switch S1 in an open (OFF) state and providing gate driver control signal to control gate switching of transistors of PWM switching circuit 303 to maintain the DC output power to system load 356 of information handling system 304.

However, when slope detection logic 392 of PWM IC 305 detects in step 404 that the rising and falling slope of the pure sine wave voltage of AC input power received from power source 301 has stopped (e.g., as illustrated at time "AC remove" in FIG. 5 and "Sinusoidal AC power stops" in FIG. 6), methodology 400 then proceeds to step 406 where PWM IC 305 begins executing power verification and control logic 394 to determine whether power source 301 is now providing non-pure sinusoidal PSU input power or non-sinusoidal PSU input power (e.g., square wave power, DC power, modified or distorted sine wave power, etc.) or has completely stopped providing any input power at all (e.g., such as when a plug of PSU 302 has been removed from a socket of power source 301 or when power source 301 has been turned off). At this time, PWM IC 305 continues providing the gate driver control signal to control gate switching of transistors of PWM switching circuit 303 to maintain the DC output power to system load 356 of information handling system 304.

In step 406 of methodology 400, power verification and control logic 394 executes on PWM IC 305 to first measure and record the voltage 365 ($V_{HV1}$ or Vac1) of the HV output while switches S1, S2 and S3 of FIG. 3B remain open (OFF). In step 408, PWM IC 305 then closes (turns ON) switch S1 and controls current generator CG1 to momentarily discharge the HV output to ground at a relatively higher current discharge rate ($I_{HV2}$) (e.g., such as 7 milliamps or any other greater or lesser current discharge rate) before closing (turning OFF) switch S1 again. Duration of such a momentary discharge may be any pre-defined finite time period that is selected to be suitably long enough to at least partially discharging Xcap 350 in the event that power source 301 has stopped providing power to PSU 302 as shown in FIG. 5, but that may also be selected to be of finite time (only momentary) in order to prevent unnecessary discharge of current from the HV output to ground in the event that power source 301 is actually continuing to provide non-pure sinusoidal input power or non-sinusoidal input power to PSU 302 as is the case described below and illustrated in FIG. 6. Then, in step 410, power verification and control logic 394 executes on PWM IC 305 to measure and record the voltage 367 ($V_{HV2}$ or Vac2) of HV output while switches S1, S2 and S3 of FIG. 3B remain open (OFF).

Next, in step 412, power verification and control logic 394 executes on PWM IC 305 to compare the recorded value of $V_{HV1}$ to $V_{HV2}$, e.g., by closing (turning ON) switches S2 and S3 and comparing the recorded values using comparator 369 of power verification and control logic 394 of FIG. 3B. If $V_{HV2}$ is found less than $V_{HV1}$ in step 412, this indicates that power source 301 has stopped providing power to PSU 302 (e.g., PSU 302 is unplugged from power source 301 or PSU 302 is turned OFF or otherwise disabled). Therefore, power verification and control logic 394 executes on PWM IC 305 to then fully discharge the Xcap in step 414 by closing (turning ON) switch S1 and controlling current generator CG1 to discharge the HV output to ground through switch S1 at the relatively higher current discharge rate ($I_{HV2}$) (e.g., 7 milliamps or other suitable greater or lesser current discharge rate) for a period of time that is at least long enough to fully discharge the Xcap 350 as shown in FIG. 5. Also in step 414, power verification and control logic 394 executes on PWM IC 305 uses gate driver control signal to stop gate switching of transistors of PWM switching circuit 303 which stops DC power output from PSU 302 to system load 356, and thus shuts down PSU 302. An example scenario where power source 301 has stopped providing power to PSU 302 is illustrated in FIG. 5, which shows simultaneous plots versus time of AC input power waveform from power source 301, $V_{HV}$, Xcap discharge current to ground, gate driver control signal, and PSU DC output current for PSU 302.

However, if $V_{HV2}$ is found equal to $V_{HV1}$ in step 412, this indicates that power source 301 is still providing non-pure sinusoidal input power or non-sinusoidal input power to PSU 302 (e.g., such as when power source 301 is a UPS that is providing a square voltage wave or other non-pure sinusoidal input power, or such as when power source 301 is currently providing non-sinusoidal DC power to PSU 302). Since power source 301 is still providing power to PSU 302, methodology 400 proceeds to step 416 and power verification and control logic 394 executes on PWM IC 305 to continue providing the gate driver control signal to control gate switching of transistors of PWM switching circuit 303 at this time to maintain the DC output power to system load 356 of information handling system 304. An example scenario where power source 301 is providing non-pure sinusoidal input power or non-sinusoidal input power to PSU 302 is illustrated in FIG. 6, which shows simultaneous plots versus time of AC input power waveform from power source 301, $V_{HV}$, Xcap discharge current to ground, gate driver control signal, and PSU DC output current for PSU 302.

In step 416, power verification and control logic 394 executes on PWM IC 305 to close (turn ON) switch S1 and to control current generator CG1 to continuously discharge the HV output to ground through switch S1 at a relatively lower current discharge rate ($I_{HV1}$) (e.g., 1 milliamp or other suitable greater or lesser current discharge rate) for as long as power source 301 is providing non-pure sinusoidal input power or non-sinusoidal input power to PSU 302, for example, as shown in FIG. 6. At the same time, power verification and control logic 394 executes on PWM IC 305 to measure $V_{HV}$ while HV output discharges at $I_{HV1}$ to ground through switch S1.

Next, in step 418 power verification and control logic 394 executes on PWM IC 305 to determine if $V_{HV}$ is decreasing while HV output discharges at $I_{HV1}$ to ground through switch S1. If $V_{HV}$ is decreasing at this time, then this indicates that power source 301 is no longer providing input power of any type to PSU 302 (e.g., such as when a plug of PSU 302 has been removed from a socket of power source 301 or when power source 301 has been turned off). Methodology 400 therefore proceeds to step 414 where power verification and control logic 394 executes on PWM IC 305 to then discharge the Xcap, stops gate switching of transistors of PWM switching circuit 303 which stops DC power output from PSU 302 to system load 356, and thus shuts down PSU 302 in the manner previously described.

However, if power verification and control logic 394 executing on PWM IC 305 determines that $V_{HV}$ is not decreasing while HV output discharges at $I_{HV1}$ to ground through switch S1, then this indicates that power source 301 continues to supply input power to PSU 302. In this case, PWM IC 305 continues providing the gate driver control signal to control gate switching of transistors of PWM switching circuit 303 to maintain the DC output power to system load 356 of information handling system 304, and methodology 400 then proceeds to step 420.

In step 420, PWM IC 305 executes slope detection logic 392 to monitor $V_{HV}$ to detect if the rising and falling slope of a pure sinusoidal voltage of an AC voltage waveform is detected while continuing to provide DC output power to system load 356. If no rising and falling slope is detected in step 420, then methodology 400 returns to step 418 and repeats again from this step. However, if the rising and falling slope of a pure sinusoidal voltage of an AC voltage waveform is detected in step 420, then this indicates that power source 301 is now supplying sinusoidal input power having a pure sine voltage wave to PSU 302. In this case PWM IC 305 continues providing DC output power to system load 356 while opening (turning OFF) switch S1 in step 422 and then returning to step 402 to repeat as previously described. FIG. 6 illustrates an example scenario where pure sinusoidal AC power input resumes in this manner.

It will be understood that methodology 400 of FIG. 4 is exemplary, and that any alternative combination of fewer, additional and/or alternative number of steps may be employed that is suitable for identifying and operating a PSU on input power having different types of input voltage waveforms (e.g., pure sinusoidal, non-pure sinusoidal and non-sinusoidal voltage waveforms) in a manner so as to continue supplying DC output power to a system load as long as the PSU is powered by either a pure sinusoidal input power (e.g., received from an AC mains power system), a non-pure sinusoidal input power (e.g., received from a UPS or other type of power source), or a non-sinusoidal input power (e.g., such as DC input power received from a UPS or other type of power source).

It will also be understood that the particular circuit configurations illustrated in FIGS. 3A and 3B are exemplary only (including the exemplary number and type of circuit and/or logic components, as well as interconnection topology of such components), as are the example current values described herein. In this regard, it will be understood that any alternative combination of fewer, additional and/or alternative number and type of circuit and/or logic components may be employed that is suitable for performing at least a portion of the PSU management tasks described in relation to FIGS. 3A and 3B, and in FIGS. 4-6.

It will also be understood that one or more of the tasks, functions, or methodologies described herein (e.g., including those described herein for PWM IC 305) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
   operating a power supply unit (PSU) to receive input power in the PSU, and to provide a direct current (DC) output power from the PSU;
   monitoring for a presence of a rising and falling voltage slope of the input power present at a power input node of the PSU;
   providing the DC output power from the PSU whenever the presence of the rising and falling voltage slope is detected at the power input node of the PSU; and
   measuring and comparing voltage at the power input node of the PSU before and after momentarily discharging current at a first rate from the power input node whenever presence of the rising and falling voltage slope is not detected at the power input node of the PSU by taking a first voltage measurement at the power input node of the PSU before the momentarily discharging current at the first rate from the power input node of the PSU and taking a second voltage measurement at the power input node of the PSU after the momentarily discharging current at the first rate from the power input node of the PSU, and then comparing the first voltage measurement made at the power input node of the PSU to the second voltage measurement made at the power input node of the PSU; and then:
      continuing to provide the DC output power from the PSU when the presence of the rising and falling voltage slope is not detected at the power input node of the PSU only when the first voltage measurement made at the power input node of the PSU and the second voltage measurement made at the power input node of the PSU are determined to be equal to each other, and
      otherwise terminating the DC output power from the PSU when the presence of the rising and falling voltage slope is not detected at the power input node of the PSU and the second voltage measurement made at the power input node of the PSU is determined to be less than the first voltage measurement made at the power input node of the PSU.

2. The method of claim 1, where the power input node is coupled to a capacitor that is charged by the input power received in the PSU; and where the method further comprises discharging a charge from the capacitor when terminating the DC output power from the PSU.

3. The method of claim 1, further comprising then continuously discharging current at a second rate from the power input node while monitoring voltage at the power input node of the PSU only when the first voltage measurement made at the power input node of the PSU and the second voltage measurement made at the power input node of the PSU are determined to be equal to each other and the presence of the rising and falling voltage slope is not detected at the power input node of the PSU; and then:
   continuing to provide the DC output power from the PSU when the presence of the rising and falling voltage slope is not detected at the power input node of the PSU only when the monitored voltage at the power input node of the PSU does not decrease with time while continuously discharging current at the second rate from the power input node; and
   otherwise terminating the DC output power from the PSU when the presence of the rising and falling voltage slope is not detected at the power input node of the PSU and the monitored voltage at the power input node of the PSU decreases with time while continuously discharging current at the second rate from the power input node.

4. The method of claim 3, where the power input node is coupled to a capacitor that is charged by the input power received in the PSU; and where the method further comprises discharging a charge from the capacitor when terminating the DC output power from the PSU.

5. The method of claim 3, further comprising responding to detection of the rising and falling voltage slope at the power input node of the PSU by terminating the discharge of current at the second rate from the power input node while continuing to provide the DC output power from the PSU.

6. The method of claim 1, further comprising detecting the rising and falling voltage slope at the power input node of the PSU when the input power received in the PSU is pure alternating current (AC).

7. The method of claim 1, further comprising not detecting the rising and falling voltage slope at the power input node of the PSU and determining the first voltage measurement made at the power input node of the PSU and the second voltage measurement made at the power input node of the PSU are equal to each other when the input power received in the PSU is direct current (DC).

8. The method of claim 1, further comprising providing the DC output power from the PSU to power a DC-powered system load of an information handling system.

9. A system, comprising:
   a power supply unit (PSU) having a power input receiving input power to the PSU and a power output providing direct current (DC) output power from the PSU;
   where the PSU comprises a programmable integrated circuit coupled to control the DC output power of the PSU, to monitor a voltage of a power input node coupled to the power input of the PSU, and to control discharge of current from the power input node;
   where the programmable integrated circuit is programmed to:
      monitor for a presence of a rising and falling voltage slope corresponding to a pure alternating current (AC) input power present at the power input node of the PSU,
      provide the DC output power from the power output of the PSU whenever the presence of the rising and falling voltage slope is detected at the power input node of the PSU, and
      measure and compare voltage at the power input node of the PSU before and after momentarily discharging current at a first rate from the power input node whenever presence of the rising and falling voltage slope is not detected at the power input node of the PSU by taking a first voltage measurement at the power input node of the PSU before the momentarily discharging current at the first rate from the power input node of the PSU and taking a second voltage measurement at the power input node of the PSU after the momentarily discharging current at the first rate from the power input node of the PSU, and then comparing the first voltage measurement made at the power input node of the PSU to the second voltage measurement made at the power input node of the PSU; and where the programmable integrated circuit is further programmed to then:

continue to provide the DC output power from the PSU when the presence of the rising and falling voltage slope is not detected at the power input node of the PSU only when the first voltage measurement made at the power input node of the PSU and the second voltage measurement made at the power input node of the PSU are determined to be equal to each other, and otherwise terminate the DC output power from the PSU when the presence of the rising and falling voltage slope is not detected at the power input node of the PSU and the second voltage measurement made at the power input node of the PSU is determined to be less than the first voltage measurement made at the power input node of the PSU.

10. The system of claim 9, where the power input node is coupled to a capacitor that is charged by the input power received in the PSU; and where the programmable integrated circuit is further programmed to discharge a charge from the capacitor when terminating the DC output power from the PSU.

11. The system of claim 9, where the programmable integrated circuit is further programmed to then continuously discharge current at a second rate from the power input node while monitoring voltage at the power input node of the PSU only when the first voltage measurement made at the power input node of the PSU and the second voltage measurement made at the power input node of the PSU are determined to be equal to each other and the presence of the rising and falling voltage slope is not detected at the power input node of the PSU; and where the programmable integrated circuit is further programmed to then:

continue to provide the DC output power from the PSU when the presence of the rising and falling voltage slope is not detected at the power input node of the PSU only when the monitored voltage at the power input node of the PSU does not decrease with time while continuously discharging current at the second rate from the power input node; and otherwise terminate the DC output power from the PSU when the presence of the rising and falling voltage slope is not detected at the power input node of the PSU and the monitored voltage at the power input node of the PSU decreases with time while continuously discharging current at the second rate from the power input node.

12. The system of claim 11, where the power input node is coupled to a capacitor that is charged by the input power received in the PSU; and where the programmable integrated circuit is further programmed to discharge a charge from the capacitor when terminating the DC output power from the PSU.

13. The system of claim 11, where the programmable integrated circuit is further programmed to respond to detection of the rising and falling voltage slope at the power input node of the PSU by terminating the discharge of current at the second rate from the power input node while continuing to provide the DC output power from the PSU.

14. The system of claim 9, where the programmable integrated circuit is further programmed to detect the rising and falling voltage slope at the power input node of the PSU when the input power received in the PSU is pure alternating current (AC).

15. The system of claim 9, where the programmable integrated circuit is further programmed to detect the rising and falling voltage slope at the power input node of the PSU and determining the first voltage measurement made at the power input node of the PSU and the second voltage measurement made at the power input node of the PSU are equal to each other when the input power received in the PSU is direct current (DC).

16. The system of claim 9, where the power output of the PSU is coupled to provide the DC output power from the PSU to a DC-powered system load of an information handling system.

17. An information handling system, comprising:
a DC-powered system load; and
a power supply unit (PSU) having a power input receiving input power to the PSU and a power output providing direct current (DC) output power from the PSU to the DC-powered system load, the PSU comprising a programmable integrated circuit coupled to: control the DC output power of the PSU, to monitor a voltage of a power input node coupled to the power input of the PSU, and to control discharge of current from the power input node;

where the programmable integrated circuit is programmed to:

monitor for a presence of a rising and falling voltage slope corresponding to a pure alternating current (AC) input power present at the power input node of the PSU, provide the DC output power from the power output of the PSU to the DC-powered system load whenever the presence of the rising and falling voltage slope is detected at the power input node of the PSU, and measure and compare voltage at the power input node of the PSU before and after momentarily discharging current at a first rate from the power input node whenever presence of the rising and falling voltage slope is not detected at the power input node of the PSU by taking a first voltage measurement at the power input node of the PSU before the momentarily discharging current at the first rate from the power input node of the PSU and taking a second voltage measurement at the power input node of the PSU after the momentarily discharging current at the first rate from the power input node of the PSU, and then comparing the first voltage measurement made at the power input node of the PSU to the second voltage measurement made at the power input node of the PSU; and where the programmable integrated circuit is further programmed to then:

continue to provide the DC output power from the PSU to the DC-powered system load when the presence of the rising and falling voltage slope is not detected at the power input node of the PSU only when the first voltage measurement made at the power input node of the PSU and the second voltage measurement made at the power input node of the PSU are determined to be equal to each other, and otherwise terminate the DC output power from the PSU to the DC-powered system load when the presence of the rising and falling voltage slope is not detected at the power input node of the PSU and the second voltage measurement made at the power input node of the PSU is determined to be less than the first voltage measurement made at the power input node of the PSU.

18. The information handling system of claim 17, where the programmable integrated circuit is further programmed to then continuously discharge current at a second rate from the power input node while monitoring voltage at the power input node of the PSU only when the first voltage measurement made at the power input node of the PSU and the second voltage measurement made at the power input node of the PSU are determined to be equal to each other and the presence of the rising and falling voltage slope is not detected at the power input node of the PSU; and where the programmable integrated circuit is further programmed to then:

continue to provide the DC output power from the PSU to the DC-powered system load when the presence of the rising and falling voltage slope is not detected at the power input node of the PSU only when the monitored voltage at the power input node of the PSU does not decrease with time while continuously discharging current at the second rate from the power input node; and otherwise terminate the DC output power from the PSU to the DC-powered system load when the presence of the rising and falling voltage slope is not detected at the power input node of the PSU and the monitored voltage at the power input node of the PSU decreases with time while continuously discharging current at the second rate from the power input node.

19. The information handling system of claim 18, where the programmable integrated circuit is further programmed to respond to detection of the rising and falling voltage slope at the power input node of the PSU by terminating the discharge of current at the second rate from the power input node while continuing to provide the DC output power from the PSU to the DC-powered system load.

20. The information handling system of claim 17, where the programmable integrated circuit is further programmed to: detect the rising and falling voltage slope at the power input node of the PSU when the input power received in the PSU is pure alternating current (AC); and to detect the rising and falling voltage slope at the power input node of the PSU and determining the first voltage measurement made at the power input node of the PSU and the second voltage measurement made at the power input node of the PSU are equal to each other when the input power received in the PSU is direct current (DC).

* * * * *